United States Patent

Kawabe

[15] 3,679,030
[45] July 25, 1972

[54] HYDRAULIC BRAKE SYSTEM
[72] Inventor: Tsuneo Kawabe, Hekikai-gun, Japan
[73] Assignee: Aisin Seiki Kabushiki Kaisha, Kariya City, Japan
[22] Filed: Nov. 17, 1970
[21] Appl. No.: 90,389

[30] Foreign Application Priority Data
 Nov. 20, 1969 Japan..................................44/93225

[52] U.S. Cl. .........................188/345, 60/54.5 E, 60/54.6 M, 188/106 P
[51] Int. Cl. ......................................................B60t 11/20
[58] Field of Search ......................188/106 P, 345, 346, 326; 60/54.5 E, 54.6 E, 54.6 M

[56] References Cited

UNITED STATES PATENTS

| | | | |
|---|---|---|---|
| 3,478,847 | 11/1969 | Bender et al............................ | 188/345 |
| 2,195,558 | 4/1940 | Bowen................................ | 188/345 X |
| 3,067,842 | 12/1962 | Smith..................................... | 188/345 |
| 3,337,009 | 8/1967 | Meier .................................... | 188/345 |

FOREIGN PATENTS OR APPLICATIONS 1,079,656 8/1967 Great Britain.........................188/345

*Primary Examiner*—George E. A. Halvosa
*Attorney*—Pierce, Scheffler & Parker

[57] ABSTRACT

A hydraulic brake system of vehicles which comprises independent primary and secondary hydraulic circuits, two wheel cylinders attached onto each front wheel brake assembly, one of the wheel cylinders being provided with two independent hydraulic chambers therein connected with the primary and secondary fluid circuits respectively, said secondary fluid circuit being further connected with each rear wheel brake assembly, one of said hydraulic chambers which connects with the primary fluid circuit being connected with the other wheel cylinder, whereby when failure of either the primary or secondary fluid circuit occurs effective and sufficient brake force may be obtained.

6 Claims, 5 Drawing Figures

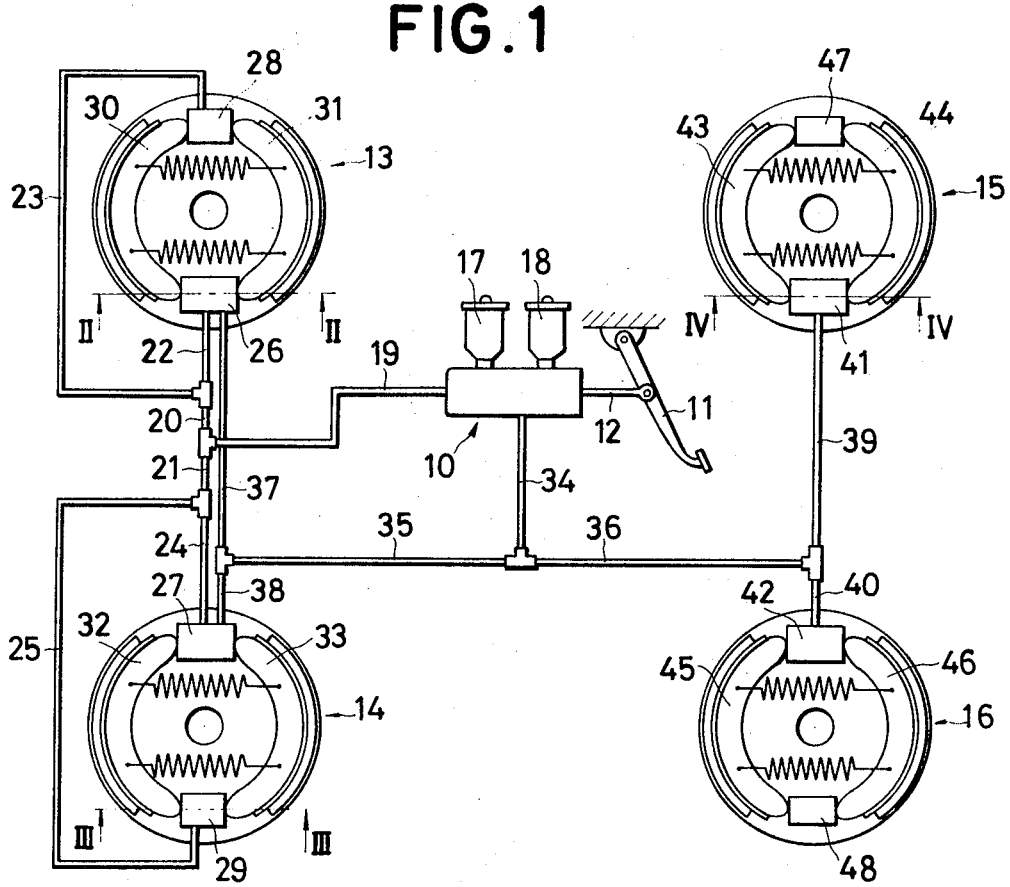

INVENTOR.
Tsuneo Kawabe
BY
Pierce, Scheffler & Parker
Attorneys

HYDRAULIC BRAKE SYSTEM

BACKGROUND OF THE INVENTION

This invention relates to hydraulic brake systems, and more particularly to improved dual brake systems for use on vehicles in which when one of the hydraulic brake circuits fails or is damaged the remaining brake circuit is utilized to actuate the brakes.

To assure effective operation of the dual brake systems it is essential that the front and rear wheel brake circuits be completely independent during brake application. It is also essential that the brake capacity of the front wheel brake assemblies of the vehicle be greater than that of the rear wheel brake assemblies, for instance 66 percent of the total brake forces are supplied to the front wheel brake assemblies while 34 percent thereof are supplied to the rear wheel brake assemblies, since the vehicle load applied onto the front wheels is greater than that applied onto the rear wheels due to transference of the vehicle loads during brake application. Thus, in the event of failure of the front wheel brake circuit the total brake capacity of conventional systems will be only 34 percent. This is highly undesirable because of insufficient brake capacity.

In order to avoid this drawback, there have been proposed several hydraulic dual brake systems in which each wheel brake assembly is supplied with two independent hydraulic circuits. However, such brake systems require the complicated structures for each wheel brake cylinder and hydraulic brake circuits which result in great cost in manufacture.

SUMMARY OF THE INVENTION

Therefore, the principal object of the invention is to provide novel hydraulic brake systems in which effective and sufficient brake force is applied in the event of failure of either hydraulic brake circuit.

Another object of the invention is to provide improved hydraulic brake systems which are inexpensive to manufacture, which are reliable in operation, and which are simple in construction.

These and other objects and advantages of the invention will become apparent from the following description together with the drawings.

BRIEF DESCRIPTION OF THE DRAWINGS

In the drawings:

FIG. 1 is a schematic representation of a vehicle brake system according to this invention;

FIG. 2 is a central vertical section of one wheel cylinder taken along the line II—II of FIG. 1, said wheel cylinder being a part of the front wheel brake assembly;

DETAILED DESCRIPTION OF THE INVENTION

Figure 3:
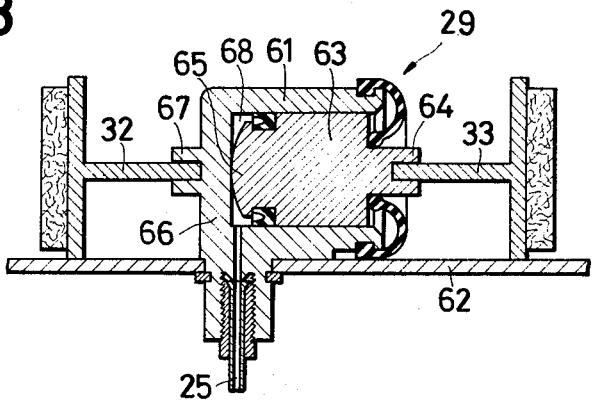
FIG. 3 is a central vertical section of another wheel cylinder taken along the line III—III of FIG. 1, said wheel cylinder being a part of the front wheel brake assembly.

Referring now more particularly to the drawings, the hydraulic brake system shown in FIG. 1 comprises a tandem master cylinder assembly 10 which is operated in the usual manner by a brake pedal 11 acting through a pushrod 12, a pair of front wheel brake assemblies 13 and 14, and a pair of rear wheel brake assemblies 15 and 16. The master cylinder assembly 10 includes a first hydraulic pressure generating chamber and a second hydraulic pressure generating chamber (both not shown) connected with a first oil-reservoir 17 and a second oil-reservoir 18, respectively, both hydraulic pressure generating chambers being independent of each other. A conduit 19 leading from the first pressure chamber of the master cylinder assembly 10 divides into branch conduits 20 and 21, said branch conduits being further divided into conduits 22 and 23, and conduits 24 and 25, respectively. The conduit 22 is connected with one wheel brake cylinder 26 of the front wheel brake assembly 13 while the conduit 24 is connected with one wheel brake cylinder 27 of the other front wheel brake assembly 14. The conduit 23 is connected with the other wheel brake cylinder 28 of the front assembly 13 while the conduit 25 is connected with the other wheel cylinder 29 of the front assembly 14. It should be noted that the construction of wheel brake cylinder 27 is the same as that of the wheel brake cylinder 26 while the construction of wheel brake cylinder 28 is the same as that of the wheel brake cylinder 29.

The wheel cylinders 26 and 28 and the wheel cylinders 27 and 29 are operative in an essentially conventional manner to displace respectively associated brake shoes 30 and 31 (FIG. 2) and brake shoes 32 and 33 (FIG. 3) outwardly against relatively rotating drums on the wheels (not shown) when the brake pedal 11 is depressed. Thus the front brake assemblies 13 and 14 are actuated in an essentially conventional manner that is known as "two-leading" type brake operation.

A conduit 34 leading from the second pressure chamber of the master cylinder assembly 10 divides into branch conduits 35 and 36. The branch conduit 35 further divides into conduits 37 and 38 to the wheel cylinders 26 and 27 of the front wheel brake assemblies 13 and 14 respectively, while the branch conduit 36 further divides into conduits 39 and 40 leading to wheel cylinders 41 and 42 of the rear wheel brake assemblies 15 and 16 respectively. The wheel cylinders 41 and 42 act on the ends of brake shoes 43 and 44 and brake shoes 45 and 46, respectively, to displace these shoes outwardly into engagement with the surrounding rotatable drums (not shown). The rear wheel brake assemblies 15 and 16 include stationary anchors 47 and 48 provided between the opposite ends of the brake shoes 43 and 44 and between those of the brake shoes 45 and 46, respectively.

In FIG. 2 there is specifically shown the construction of one wheel brake cylinder 26 which includes a housing 49 opened at one end and fixed to a backing plate 50 of the front wheel brake assembly 13, and hydraulic pistons 51 and 52 slidably fitted therein. The piston 51 normally makes contact at its forked end 53 with the brake shoe 30 and at its opposite spherical end 54 with a flat end wall 55 of piston 52, a spherical end 56 of piston 52 making contact with a flat end wall 57 of the cylinder housing 49. The cylinder housing 49 normally makes contact at its forked end 58 with the brake shoe 31. Between the two pistons 51 and 52, there is constituted a first hydraulic brake chamber 59 with which the conduit 22 is connected, while there is constituted a second hydraulic brake chamber 60 between the piston 52 and the end wall 57 of the cylinder housing 49 with which the conduit 37 is connected.

Similarly, the conduit 24 is connected with a first brake chamber (not shown) of the wheel cylinder 27 while the conduit 38 is connected with a second brake chamber (not shown) thereof.

The detailed structure of the wheel brake cylinder 29 is illustrated in FIG. 3 in which the cylinder 29 comprises a housing 61 opened only at one end and fixed to a backing plate 62 of the front wheel brake assembly 14, and a single piston 63 slidably fitted therein. The piston 63 normally makes contact at its forked end 64 with the brake shoe 33 and at its opposite spherical end 65 with a flat end wall 66 of cylinder housing 61. The cylinder housing 61 normally makes contact at its forked end 67 with the brake shoe 32. There is constituted a hydraulic brake chamber 68 between the piston 63 and the end wall 66 of the cylinder housing 61 with which the conduit 25 is connected.

Similarly, the conduit 23 is connected with a hydraulic brake chamber (not shown) of the wheel cylinder 28.

Figure 4:
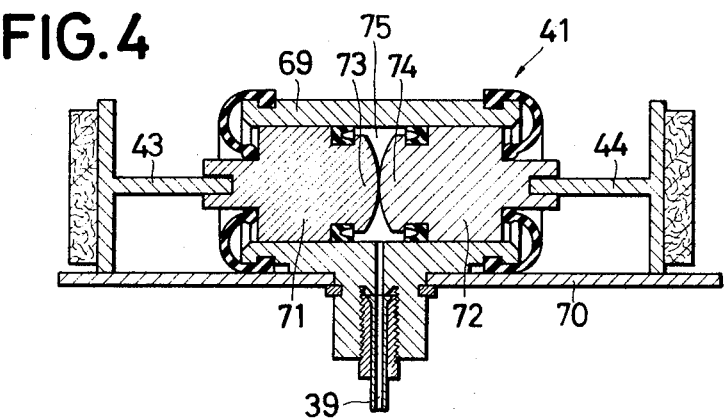
FIG. 4 is a central vertical section of a further wheel cylinder taken along the line IV—IV of FIG. 1, said wheel cylinder being a part of the rear wheel brake assembly.

In FIG. 4, the rear wheel brake cylinder 41 is specifically shown in which the cylinder 41 comprises a housing 69 opened at each end and fixed to a backing plate 70, and a pair of pistons 71 and 72 slidably fitted therein, both pistons contact with each other at their inner spherical ends 73 and 74. Between both pistons 71 and 72 there is constituted a hydraulic brake chamber 75 with which the conduit 39 is connected. The outer ends of pistons 71 and 72 normally make contact with the brake shoes 43 and 44, respectively.

Similarly, the conduit 40 is connected with a hydraulic brake chamber (not shown) of the wheel cylinder 42 which is similar to cylinder 41.

The circuit comprising the first pressure chamber of the master cylinder assembly 10, the conduits 19, 20, 21, 22, 23, 24 and 25, the first brake chambers of the wheel cylinders 26 and 27, and the brake chambers of the other wheel cylinders 28 and 29 may be called the primary hydraulic circuit. The circuit comprising the second pressure chamber of the master cylinder assembly, the conduits 34, 35, 36, 37, 38, 39 and 40, the second brake chambers of the wheel cylinders 26 and 27, and the brake chambers of the wheel cylinders 41 and 42 may be called the secondary hydraulic circuit. It should be recognized that the braking capacity of the front wheel brake assemblies 13 and 14 is adapted to be 66 percent of the total brake force while that of the rear wheel brake assemblies 15 and 16 is adapted to be 34 percent.

In operation, when no failure occurs in the brake system, upon depression of the foot pedal 11 the primary and secondary hydraulic circuits are pressurized to actuate the respective associated wheel cylinders. The hydraulic pressure admitted to the first brake chamber 59 of wheel cylinder 26 will cause the piston 51 to move in the left direction in FIG. 2 thereby applying the brake shoe 30 against the rotating drum. Simultaneously, the hydraulic pressure admitted to the hydraulic brake chamber 68 of cylinder 29 will cause the piston 63 to move in the right direction in FIG. 3 thereby applying the brake shoe 33 against the rotating drum. In similar way the remaining front wheel cylinders 27 and 28 are actuated so that both front wheel brake assemblies 13 and 14 are brought into their two-leading type braking operation. It should be noted that the hydraulic pressure led to the second brake chamber 60 of the wheel cylinder 26 will cause no movement of the piston 52 since the hydraulic pressure in the second brake chamber 60 urging the piston 52 to move toward the left is equal to that in the first brake chamber 59 urging the piston 52 to move toward the right.

Simultaneously with the braking operation of the front wheel brake assemblies, the rear wheel brake assemblies 15 and 16 are brought into their braking operation that is known as a "leading-trailing" type brake operation. The hydraulic pressure admitted to the brake chamber 75 of the wheel cylinder 41 will cause both pistons 71 and 72 to be moved apart from each other thereby applying respective brake shoes 43 and 44 against the rotating drum. In a similar way the wheel cylinder 42 is actuated to apply the brake.

In the event of failure of the primary hydraulic circuit, the hydraulic pressure supplied to the second brake chamber 60 of the wheel cylinder 26 will cause the piston 52 together with the piston 51 to move in the left direction in FIG. 2 thereby permitting the brake shoe 30 to press against the rotating drum. A wheel cylinder 27 is actuated in the similar way, while the wheel cylinders 28 and 29 remain ineffective since no hydraulic pressure is supplied thereto. Consequently, the braking capacity of the front wheel brake assemblies 13 and 14 will be 33 percent. As to the rear wheel brake assemblies, the normal hydraulic pressure is supplied thereto so that the braking capacity thereof will be 34 percent. As a result, the total braking capacity of the brake system will be 67 percent.

In the event of failure of the secondary hydraulic circuit, the normal hydraulic pressure is supplied both to the wheel cylinders 26 and 27 and to the other wheel cylinders 28 and 29 of the front wheel brake assemblies, while no hydraulic pressure is supplied to the rear wheel brake assemblies. As a result, the total braking capacity of the brake system will be that of the front assemblies 13 and 14, i.e., 66 percent.

Figure 5:
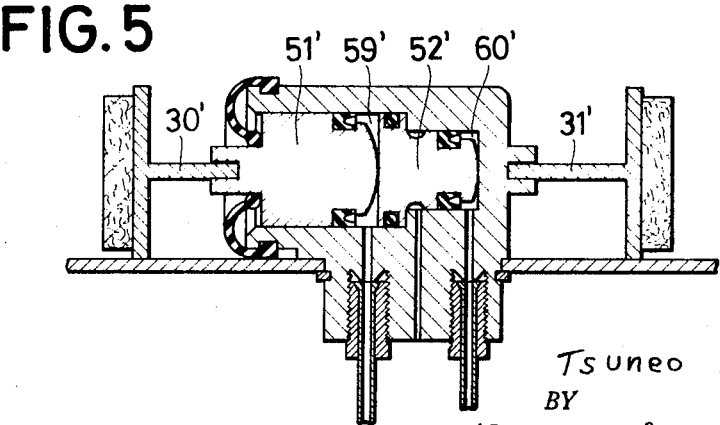
FIG. 5 is a view similar to FIG. 2, but showing an alternative form thereof.

In FIG. 5, the modified form of the wheel cylinder 26 or 27 of the front wheel brake assembly 13 or 14 is illustrated in which the piston 52' is of smaller diameter than the piston 51'. In the event of failure of the primary hydraulic circuit, the brake applying force to press the brake shoe 30' against the rotating drum due to the hydraulic pressure supplied to the second brake chamber 60' is smaller than that due to the hydraulic pressure supplied to the first brake chamber 59'.

On the contrary, when the piston 52' is of larger diameter than the piston 51' the brake force due to advancement of the piston 52' will be greater than that of the piston 51'. Thus, employment of pistons having different diameters exposed to the hydraulic pressure will allow the braking capacity to be set at a suitable valve.

I claim:

1. A hydraulic brake system for vehicles comprising a master cylinder assembly including a first pressure chamber and a second pressure chamber independent of each other, a pair of front wheel brake assemblies, each including two front wheel brake cylinders, a pair of rear brake wheel assemblies, each including rear wheel brake cylinder means, one of said front wheel brake cylinders in each front wheel brake assembly having two pistons slidably mounted therein, normally contacting each other, and having different effective diameters, said pistons providing first and second wheel brake chambers independent of each other, the other of said front wheel brake cylinders in each front wheel brake assembly being provided with a third wheel brake chamber therein, said first wheel brake chamber being connected for fluid communication with said first pressure chamber of the master cylinder assembly and with said third wheel brake chamber said second wheel brake chamber being connected for fluid communication with said second pressure chamber of the master cylinder assembly and with said rear wheel brake cylinder means.

2. A hydraulic brake system as claimed in claim 1 wherein said two pistons are provided with spherical end portions facing said first and second wheel brake chambers respectively.

3. A hydraulic brake system as claimed in claim 1 wherein the other of said front wheel brake cylinders includes one piston.

4. A hydraulic brake system as claimed in claim 1 wherein said pair of rear wheel brake assemblies each include a pair of opposed pistons adapted to separate upon application of a braking force.

5. A hydraulic brake system as claimed in claim 1 wherein said front wheel brake assemblies are adapted for two-leading brake operation.

6. A hydraulic brake system as claimed in claim 5 wherein said rear wheel brake assemblies are adapted for leading-trailing operation.

* * * * *